W. W. MACFARLANE.
ELECTRICAL SYSTEM OF TRAIN COMMUNICATION.
APPLICATION FILED NOV. 22, 1917.

1,389,258.

Patented Aug. 30, 1921.
8 SHEETS—SHEET 7.

Inventor:
by William W. Macfarlane
                    Atty

UNITED STATES PATENT OFFICE.

WILLIAM W. MACFARLANE, OF PHILADELPHIA, PENNSYLVANIA, ASSIGNOR TO MACFARLANE COMMUNICATIONS CORPORATION, OF NEW YORK, N. Y., A CORPORATION OF DELAWARE.

ELECTRICAL SYSTEM OF TRAIN COMMUNICATION.

1,389,258.      Specification of Letters Patent.      Patented Aug. 30, 1921.

Application filed November 22, 1917. Serial No. 203,378.

*To all whom it may concern:*

Be it known that I, WILLIAM W. MACFARLANE, a citizen of the United States of America, and a resident of Philadelphia, in the county of Philadelphia and State of Pennsylvania, have invented a certain new and useful Electrical System of Train Communication, of which the following is a specification.

The present invention relates generally to electrical systems of communication used in the operation of trains. One object of the invention is to render a train constantly responsive to external influences. Emphasis should be placed on the word "constant," and this will, to those skilled in the art, at once indicate the value of the present improvement over other systems of communication, such as those effected by train controlling devices that operate at the end of each block section, or, at most, at intermediate points in a block section.

Another object of the invention is to admit of interchange of intelligence, such, for instance, as telephonic communication, between the train, whether at rest or in motion, and stations at outside points. By means of the present system, intercommunication may be had between a train and a central station, between trains occupying different sections of track, or between cars of the same train, whether occupying the same on different track sections. Thus, a conductor on a train may keep in touch at all times with the despatcher, a traveler, while *en route*, may have telephonic communication with his business office; or the brakeman in the caboose of a freight train may talk with the engineer, or vice versa.

One feature of the invention consists in impressing upon the track, current of sufficient volume to permeate a number of the parallel paths that the current may take; and in placing upon the car forming one of said parallel paths a translating device of low resistance so capacitated as to utilize such current for whatever purpose it may be required, there being a local circuit on the train responsive to the translating device. In this way, the train will pick up from the track sufficient current to operate other mechanisms, or to close a local circuit that controls devices such as a signal, a brake valve or a telephone. The parallel paths may be established in various ways. For instance, two rails of a track may be bridged by the translating device, or a path extending longitudinally of the car may be in shunt with or parallel to one rail, in which case the translating device is in circuit with the same rail at two points. In that case, two rails of different tracks may be used as the track circuit by extending conductors between them.

When the invention is applied to train telephone systems, there is to contend with not only the difficulties that are inherent in train control with reference to picking current from the track, but also difficulties peculiar to telephoning operations. For instance, the amount of current passing through the modern telephone transmitter should not generally exceed one-quarter ampere, and, of course, such a condition must be overcome.

Taking all these factors into consideration, I have found that, by placing an induction coil at the wayside and an induction coil on the train, and including the low resistance windings of the two coils in circuit with the track, and further in having a local circuit on the train connected to the high tension winding of the train-carried coil, and in having a wayside circuit connected to the high tension winding of the wayside induction coil, telephone communication may be established from the train through the track with external points and, conversely, from external points through the track with the train.

The means whereby the low resistance translating device or low tension winding of the train carried induction coil is placed in circuit with the track may, of course, vary widely and may consist of contact shoes separate from the traffic wheels; but, in the present instance, I prefer to pick up current through the traffic wheels, and to connect the translating device to the journal brasses in the journal boxes.

Other features of invention will appear as the specification proceeds.

The invention is embodied in the accompanying drawings in which—

Figure 1:
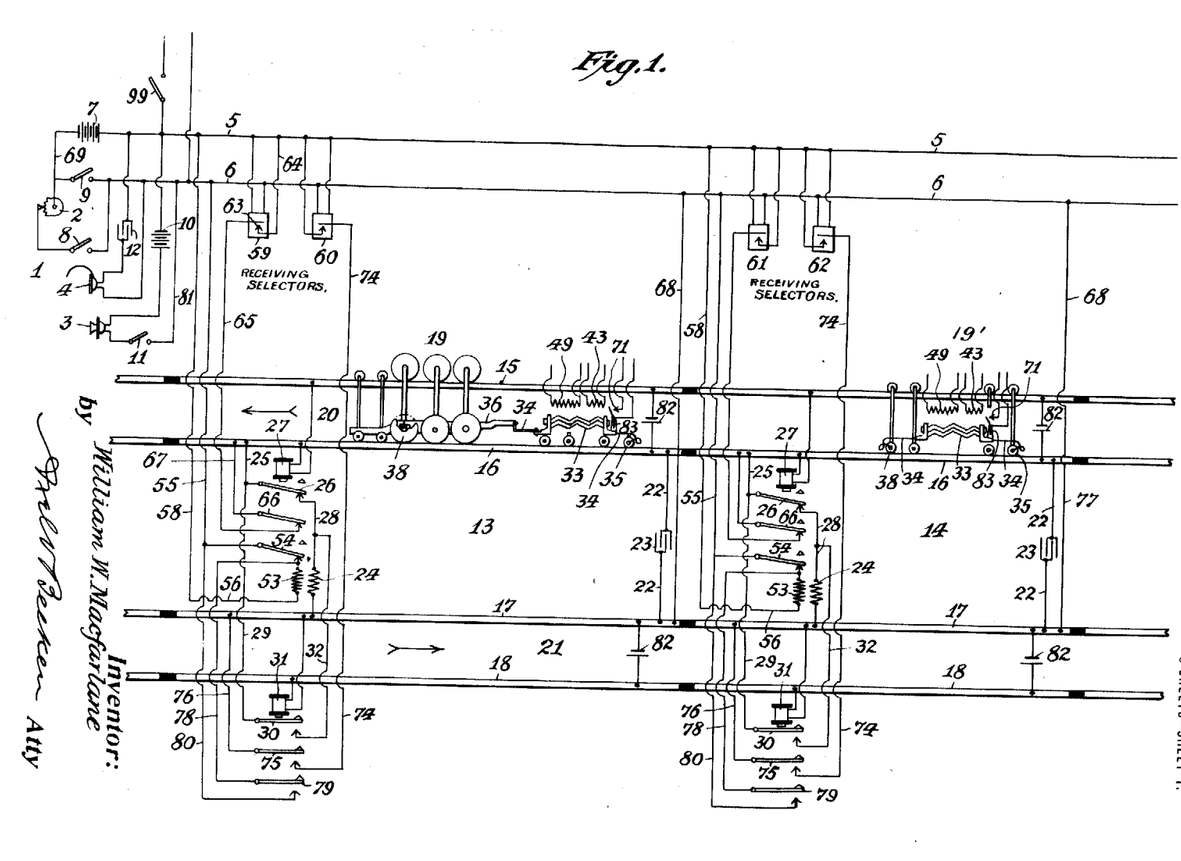
Figure 1 is a diagrammatic view of an electrical system of communication embodying one form of the invention as applied to train telephoning.

In Fig. 1 of the drawings there is disclosed, in diagrammatic form, one embodiment of the invention in which telephonic communication may be had between a despatcher's wayside station and a train, between the cab of a locomotive and a car at the rear of the same train and in a different block section from that of the locomotive, or between two trains in different block sections. To show the relation of the despatcher's station to the track system, two block sections 13 and 14 of a double track 20 and 21 comprising rails 15, 16, 17 and 18 are illustrated with their electrical connections with the line conductors 5 and 6 communicating with the despatcher's station 1. There is also illustrated a train consisting of a locomotive 19 and a car 19' occupying both blocks; or, the locomotive 19 may be considered one train in one section and the car 19' another train in a different section.

The track and car circuit consisting of parallel paths, and through which it is desired to pass a large volume of current, here takes the following form: Rail 16 of track 20 and rail 17 of track 21 are connected, at one end of the block, by a conductor 22 preferably having a condenser 23 and, at the other end of the block, by conductors including the low tension winding 24 of a wayside induction coil. The high tension winding 53 of this wayside induction coil is suitably connected with line wires 5 and 6. Mounted on the car is a low resistance translating device, here represented by the low tension winding 33 of an induction coil, the high tension windings of which are indicated at 43 and 49. The low tension winding 33 is in communication with the rail 16 through the wheels 35 and 38 so that there is in effect a path parallel to the rail 16 through said low tension winding. No insulation is required between the path of low resistance just described and the remainder of the car. I have found that by impressing a relatively large volume of current upon the conductors of this circuit, the parallel paths thereof will be permeated by the current or a large volume of the current will flow therethrough regardless of differences in potential in the paths; and that, if this current is impressed upon the circuit by means of the wayside low tension winding 24, a sufficient amount will pass up the low tension winding 33 to energize it; and, conversely, if the current is impressed upon the circuit by means of low tension winding 33, it will not merely pass by way of wheel 38 through rail 16 and back through wheel 35 to low tension winding 33, but will also pass through other conductors of the track circuit by way of low tension winding 24 of the wayside induction coil, rail 17 and back through conductor 22. It will be understood that the current so impressed must be of sufficient volume to permeate the parallel paths; but, at the same time, the voltage of the current so impressed need not be very great, and must not be so great as to cause it to be grounded in passing through the track. Indeed, one of the difficulties in railroad signaling resides in the fact that an excessive voltage cannot be passed through the tracks but by use of current having a relatively large volume, I have obtained very good results notwithstanding the employment of current of low voltage.

While current of a relatively large volume should be used in the track circuit, such current cannot be passed through a telephone transmitter for any length of time without heating said transmitter excessively and destroying it. Current having considerable voltage, however, may be passed through a telephone transmitter especially if there is considerable resistance in the line. I have found that by placing the high tension winding of an induction coil in the line, a considerable amount of voltage may be used because of the resistance of the high winding; and that, at the same time, this energy may be transformed into a current of relatively large volume suitable for use in a track circuit. While I do not wish to limit myself to exact proportions, I have found that high tension windings such as 53, 43 and 49, may have thirty-nine hundred convolutions of, say, No. 22 or No. 34 wire. In some cases, I have had very good results by winding 49 with from three to five thousand convolutions of No. 34 wire and giving the winding 43 five hundred and ten convolutions of No. 22 wire. The low tension winding 33 may be given thirty convolutions of a very coarse wire or ribbon-like material having a diameter of from one-eighth to three-eighths of an inch. As indicated diagrammatically, this low tension winding may consist of a plurality of parallel coils each surrounding a core, the several coils being electrically connected in parallel and the cores being preferably connected to a unitary pole-piece at each end. The device, as a whole, is about two inches in diameter. A more detailed description of this coil will be given at another point in the specification. The low tension winding 24 of the wayside induction coil may be given two hundred and twenty-five convolutions of No. 15 wire.

In the transmission of speech from transmitter 3 of the despatcher's station, switch 11 being closed, current will pass from battery 10, which may have considerable voltage, to line wire 5 and by way of conductor 58 and conductor 56 to the high tension winding 53 of the wayside induction coil, thence by way of armature 54 and conductor 55 to line wire 6 and by way of conductor 81 back to the transmitter and battery. This will energize low tension winding 24 with a large volume of current which will pass by way of rail 17 through conductor 22, condenser 23, rail 16; and also by way of wheel 35, low tension winding 33, wheel 38, to conductor 25, armature 26, and conductor 28 back to winding 24. This will, in turn, energize high tension winding 49 of the car-carried induction coil thereby transmitting current to the receiver 48, the circuit of which is closed between hook 50 and contact 51 when the receiver is removed from the hook. In the same manner, telephonic communication may be had from transmitter 41, switch 44 being closed, by way of battery 42 to high tension winding 43. This will energize low tension winding 33, and, in turn, low tension winding 24 of the wayside induction coil thereby energizing high tension winding 53 and transmitting current to line wires 6 and 5 from which it passes to receiver 4 through the branch circuit including condenser 12.

When calling from the despatcher's station to the train for the purpose of indicating that telephonic communication is desired, various means may be utilized for impressing a large volume of current upon the track and car circuit. For instance, 7 indicates a battery capacitated to permit a large volume of current of relatively low voltage to flow. 2 is a selector and 59, 60, 61 and 62 are receiving selectors operating in response to selector 2. It will be seen, that by closing switch 8 and opening switch 9, current will flow from battery 7 along line wire 5, say to conductor 64, of receiving selector 59 whose contact 63 will be closed in response to the operation of selector 2, and from thence current will flow by way of conductor 65 to armature 66 and conductor 67 to rail 16 through the low tension winding 33 and by way of conductor 22, condenser 23 to rail 17 and then by conductor 68 to line wire 6 and thence back to battery 7. It will be noted that this current does not pass through high resistance winding 53 of the wayside induction coil and, being a direct current and not transmitting speech, no induction will be set up in high tension windings 43 and 49. However, the core 33 will become energized and will move circuit closer 83 into engagement with contact 71 thereby closing the circuit including lamp 39 and battery 70, the lighting of the lamp 39 thus indicating that the despatcher desires to communicate by telephone. Should communication be desired between two trains or between the cab of the locomotive of a train and another part of the same train in a different block, the operation will be as follows: The attendant controlling telephone set 40 will close switch 46 and open switch 44; then operate the alternating current generator 45 thereby energizing high tension winding 43 and, in turn, inducing current in low tension winding 33. This, in turn, will energize low tension winding 24 of the wayside induction coil causing high tension winding 53 to transmit current to line wires 5 and 6. Current will then flow through line wire 5, over conductor 58 in block 14, conductor 56, high tension winding 53, armature 54, conductor 55, back to line wire 6. This will energize low tension winding 24 of the wayside induction coil in block 14 which, in turn, will energize low tension winding 33 of the car in block section 14, thereby inducing a current in high tension winding 49 to actuate a polarized bell 47 whose circuit is closed by hook 50 engaging contact 52. This will indicate that telephonic communication is desired by a car ahead, or another train, as the case may be. Telephonic communication will then be established by transmission of current from transmitter 41, high tension winding 43, low tension winding 33, low tension winding 24, high tension winding 53 of one block section, line wires 5 and 6, high tension winding 53 of the other block section, low tension winding 24, low tension winding 33, high tension winding 49 to receiver 48, and vice versa.

Should the despatcher desire communication with a train in block section 13 of track 21, the selector 2 will be operated to close receiving selector 60. Current will then flow from conductor 5, through selector 60, by way of conductor 74, armature 75, conductor 76, rail 17, conductor 68, back to line wire 6. Similarly, the telephone circuit between despatcher's station 1 and a train in clock 13 of track 21 will be from line wire 5 by way of conductor 58, conductor 56, high tension winding 53, conductor 78, armature 79, conductor 80, conductor 55, back to line wire 6. This will energize low tension coil 24 and will establish a circuit by way of rail 17, conductor 22, condenser 23, rail 16, conductor 25, conductor 29, armature 30, conductor 32, conductor 28 back to low tension winding 24. The car on rails 17 and 18 will then pick up the current in a manner previously described in connection with the car on rails 15 and 16.

It will be seen that high tension winding 53 and low tension winding 24 of the wayside induction coil serve both for tracks 20 and 21 by reason of the fact that one rail of each track is included in the circuit supplied by low tension winding 24. It will also be understood that relays 27 and 31 are energized by track batteries 82 and that they normally hold the armatures they control in their upper positions or away from their contacts so that normally there is no current flowing. The entrance of a train, however, into a block will short circuit the relay of that block as indicated by relays 27 of track 20 in blocks 13 and 14. The relays 31, of unoccupied track 21, are shown energized with the result that the circuits are broken. The function of condensers 23 is to prevent the passage of track circuit current from track 20 to track 21 or vice versa.

Figure 2:
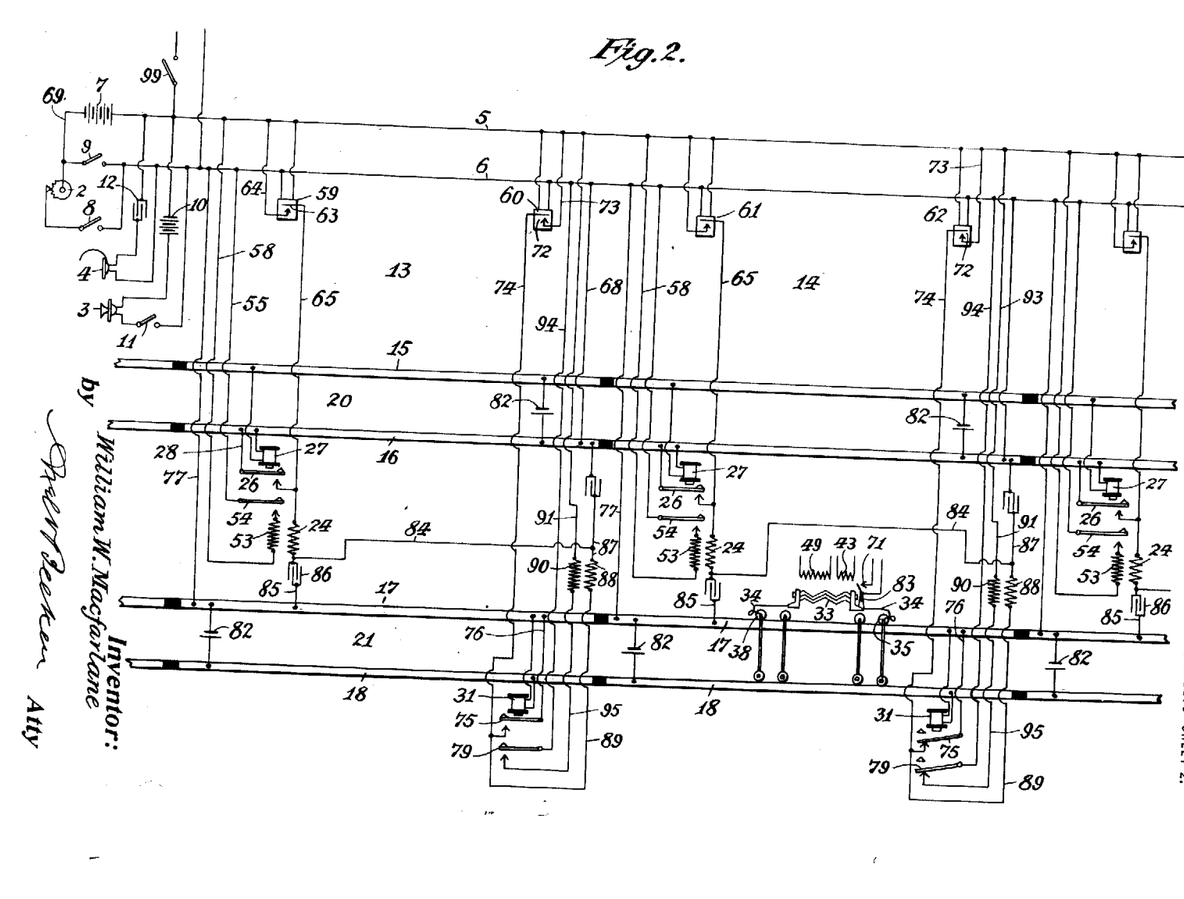
Fig. 2 is a diagrammatic view showing a modified form of the embodiment shown in Fig. 1.

In the embodiment of the invention illustrated in Fig. 2, a conductor in each block extending the length of the block is used in conjunction with one rail of either track 20 or 21 to serve as the main conductor of the track circuit. The circuit established by operation of selectors 2, 59, 60, etc., is as follows: If the selector 59 is closed, current will flow from line wire 5, through conductor 64, contact 63, conductor 65, armature 26, conductor 28, rail 16 and conductor 68 back to line wire 6, thereby lighting lamp 39 in the cab of the locomotive of a train occupying block 13 of track 20, as previously described. Telephoning may then be carried on from the cab to the despatcher, or to another car in a different section, the track circuit passing through the low resistance windings of the wayside and car-carried induction coils being as follows: from low tension winding 24 by way of conductor 84, conductor 87, rail 16, conductor 28, armature 26, back to winding 24. The path of current from low tension winding 24 to the line wires is through high tension winding 53, through armature 54 and conductor 55 to line wire 6 and by means of conductor 58 to line wire 5.

If it is desired to call a train in block 13 on track 21, selector 60 is closed so that current will flow by way of conductor 73, contact 72, conductor 74, armature 75, conductor 76, rail 17, conductor 77 to line wire 6. This will light lamp 39 in a train occupying block 13 in track 21. The track circuit for the purpose of telephonic communication between a train in block section 13 of track 21 and the despatcher's station will be established as follows: from rail 17 by way of conductor 76, armature 75, conductor 89, low tension winding 88, conductor 84, conductor 85 back to rail 17. The connection between this track circuit and the line wires will then be as follows: high tension winding 90, conductor 95, armature 79, conductor 94 to line wire 6 on one side, and by means of conductor 91 to line wire 5 on the other side.

It will be noted that in the modification shown in Fig. 2, there are two wayside induction coils for each block section of double tracks because of the interposition of conductor 84; and that, not only is relay 27 located at the entrance of the block that it controls, but relay 31 is also located at the entrance of its block, assuming the travel on the two tracks to be in opposite directions.

Figure 3:
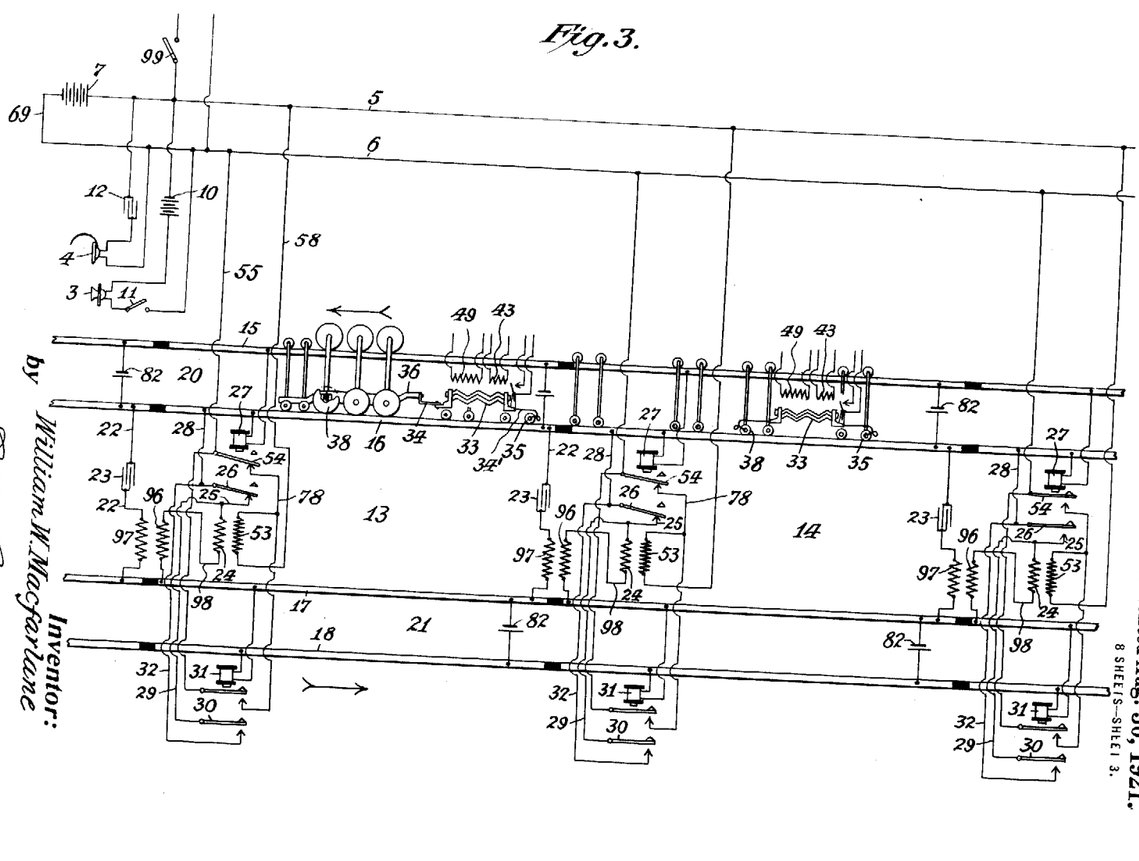
Fig. 3 is a diagrammatic view showing still another modification of the embodiment disclosed in Fig. 1.

In Fig. 3, a modification is shown by which trains occupying adjacent blocks, or cars of the same train situated in different blocks, may communicate with each other without the necessity of going through line wires 5 and 6. This is accomplished by including low tension windings 96 in series with low tension windings 24 by means of conductor 98 and mounting in inductive relation thereto another low tension winding 97 interposed in conductor 22 of the adjacent block. It will be seen that a track current generated, say, by means of low tension winding 33 in block 14 will energize low tension winding 24 of the wayside induction coil and also low tension winding 96. This, in turn, will induce current to flow in low tension winding 97 of conductor 22 in block 13 and will thereby impress current upon the conductors of track section 13 which current will then be picked up by low tension winding 33 in section 13. It will be understood that with this arrangement communication may also be had between the despatcher and any of the trains by way of the line wires in the same manner as previously described in connection with Figs. 1 and 2.

In all three forms of the invention described, the despatcher by closing switch 99 may connect the train, by way of line wires 5 and 6, to a public telephone line.

Figure 5:
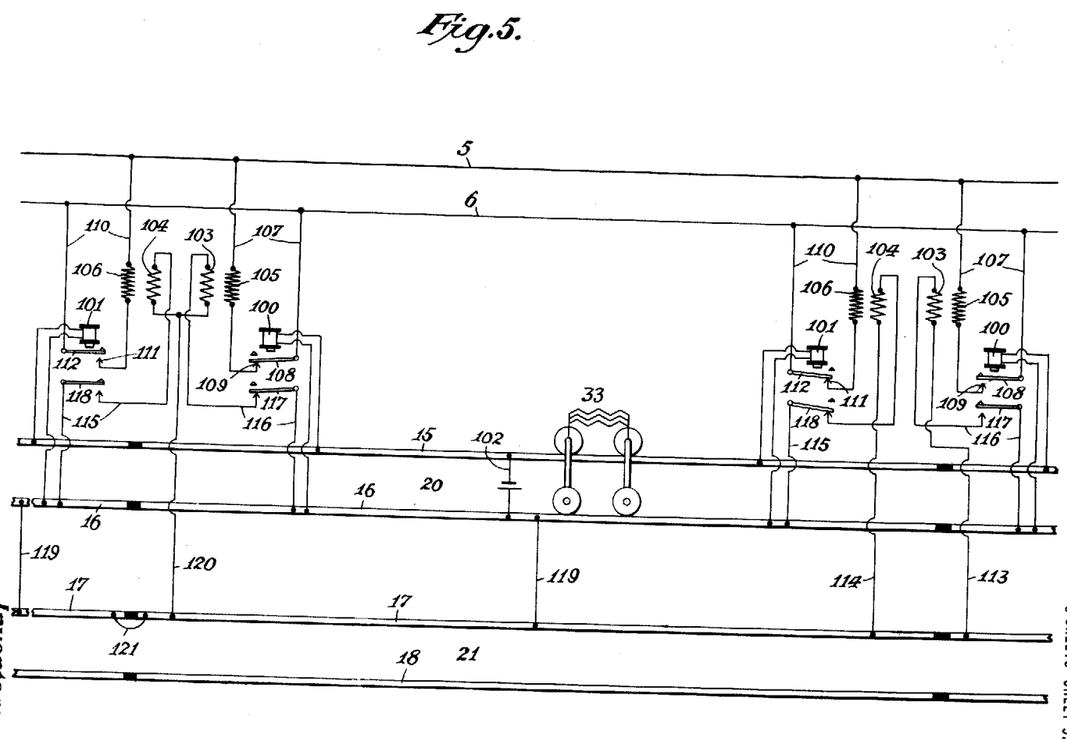
Fig. 5 is a diagrammatic view showing a modified form of track circuit.

In the modification shown in Fig. 5, there is arranged an induction coil at each end of each block. As here shown, a relay 100 is located at one end of the block, and a relay 101 at the other end, both normally energized by the track battery 102 disposed centrally of the block. 103 indicates a low tension winding at one end of the block; and 104 a low tension winding at the other end. 105 and 106 are corresponding high tension windings. The high tension windings 105 are connected by branch conductors 107 to line wires 5 and 6 in which conductors is included an armature 108 which, when the relay 100 is energized, ruptures the circuit at the contact 109. Similarly, branch conductors 110 connect high tension windings 106 with line wires 5 and 6 and have included a contact 111 and armature 112 controlled by relay 101. In the form of the invention shown at the right hand end of Fig. 5, the low resistance windings are connected to rail 17 of track 21 by conductors 113 and 114 and to rail 16 of track 20 by means of conductors 115 and 116 including armatures 117 and 118 controlled by relays 100 and 101. 119 indicates a conductor bridging rails 16 and 17 at an intermediate point in each block. In the form of invention shown to the left of Fig. 5, the low resistance windings 103 and 104 are connected to rail 16 by means similar to those at the right hand end of the figure but are connected by common return conductor 120 to rail 17. 121 indicates a bond bridging the insulation between adjacent blocks.

If a car is in the block as shown in the figure, a track and car circuit will be established as follows: Starting, say, with low tension winding 104, current will flow by way of conductor 114 to rail 17, over conductor 119, to rail 16, low tension winding 33, rail 16, conductor 115, armature 118, conductor 115 back to low tension winding 104. As the car progresses through the block to the left, it will receive current from low tension winding 103 by way of common conductor 120, rail 17, conductor 119, rail 16, low tension winding 33, rail 16, conductor 116, armature 117, conductor 116, and back to low tension winding 103.

When the car passes into the block to the left, the car will receive current from low tension winding 104 by way of conductor 120, rail 17, bond 121, rail 17, conductor 119, rail 16, low resistance winding 33, rail 16, conductor 115, armature 118, and conductor 115 back to low tension winding 104.

Figure 6:
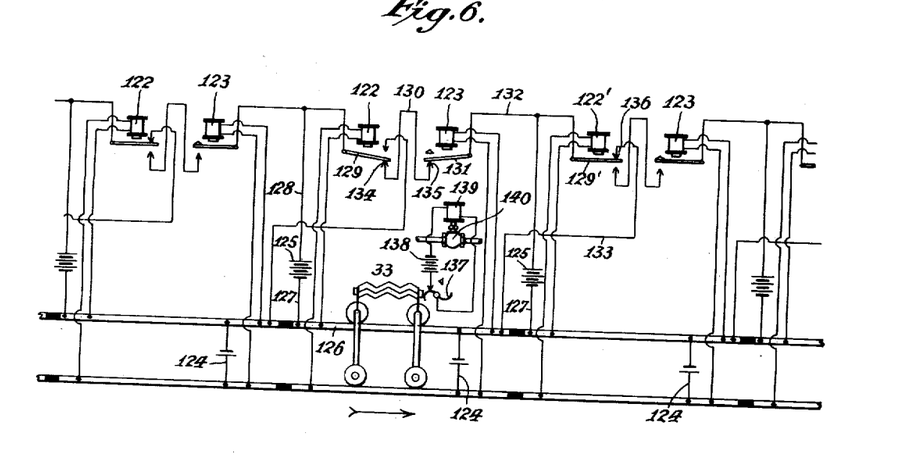
Figs. 6 and 7 are diagrammatic views showing the invention embodied in a train control system other than a telephone system.
Figure 7:
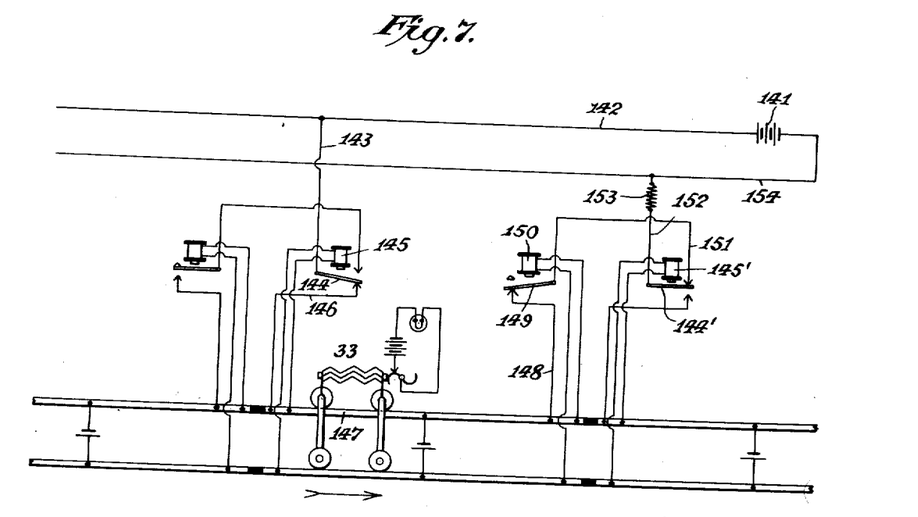

In Figs. 6 and 7 are shown two forms of train controlling means, other than telephoning means, embodying the invention.

In Fig. 6, 122 is a relay at one end of the block and 123 a relay at the other end of the block energized by a suitable track battery 124. 125 is a battery connected to the rail 126 on one side by means of conductor 127, and on the other side by means of conductor 128, armature 129, conductor 130, armature 131, conductor 132, armature 129′ and conductor 133. It will be seen that when a train occupies a block, the armatures 129 and 131 will be dropped because of the deënergization of relays 122 and 123 thereby closing the circuit at 134 and 135; and if no train is in the block to the right, armature 129′ will be in engagement with contact 136, thereby closing the circuit at that point. The translating device 33 on the car is here in the form of a magnet controlling armature 137, so that when current flows from battery 125 over the circuit described to the rail, said armature 137 will close a local car circuit including battery 138 and magnet 139. This magnet, when energized, holds brake valve 140 in the train line, or elsewhere, in such position that the brakes will not be applied.

It will be understood that so long as relay 122′ of the adjacent block is energized, indicating that no train is present, current will flow through the translating device 33 and the brakes will be inoperative. Should, however, a train enter the adjacent block, thereby deënergizing relay 122′, the circuit will be ruptured and the brakes will be applied. It will be observed that the train is constantly responsive to any change in traffic conditions in the adjacent block and it is not necessary to wait until it gets to the end of the block to receive an indication.

The battery 125 is adapted to supply a relatively large volume of current at a relatively low voltage and, when no train is in a block, the circuit including said battery will be ruptured by the energization of relays 122 and 123. In Fig. 7, the construction is substantially the same as in Fig. 6 with the exception that line conductors, instead of local batteries, are used. The circuit there is from a source 141, supplying a large volume of current by way of line conductor 142, branch conductor 143, armature 144 of relay 145, conductor 146, rail 147, translating device 33, rail 147, conductor 148, armature 149 of relay 150, conductor 151, armature 144′ of relay 145′, conductor 152 including resistance 153, line conductor 154 back to source 141.

Figure 8:
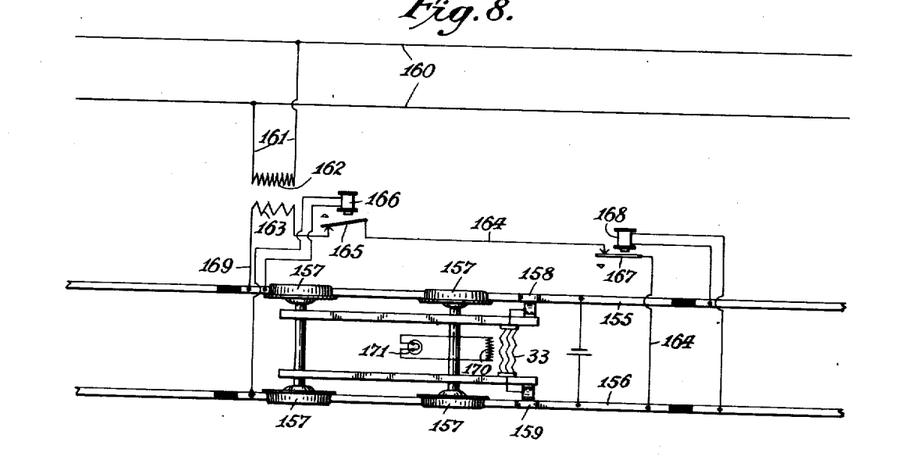
Fig. 8 is a diagrammatic view showing a modified form of the system in which the translating device bridges two rails, and receives current through contact shoes instead of through the wheels.

In Fig. 8, the translating device or low tension winding 33 is shown as bridging the two rails 155, 156 of the same traffic track instead of being in shunt with one rail only, as shown in the previous figures. Also, instead of picking up the current through the traffic wheels 157, contact shoes 158, 159 are used which are electrically connected to 33. The current is impressed upon the track and car circuit, consisting of parallel paths, from line wires 160 by means of branch conductors 161 to high tension winding 162 of the wayside induction coil. From the low tension winding 163, of the wayside induction coil, the current passes by way of conductor 164, armature 165 controlled by relay 166 of the train occupied section, conductor 164, armature 167 controlled by relay 168 of another section. Conductor 164 to track rail 156, contact shoe 159, translating device 33, contact shoe 158, rail 155 and conductor 169 back to low tension winding 163. As an example of the use of the current, the high tension winding 170 and circuit including lamp 171 is shown.

The translating device 33 is here in a path parallel to wheels 157 and their axles, but picks up enough of the current to become properly energized.

In Figs. 12 to 16 are shown various forms of translating devices capable of being utilized in connection with the system disclosed.

Figure 14:
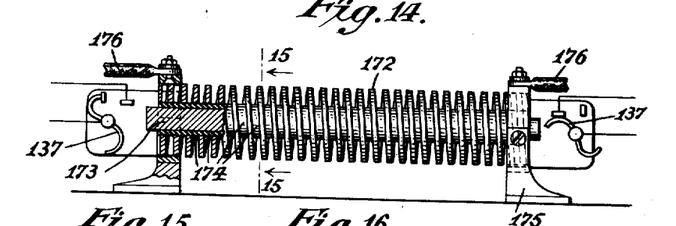
Fig. 14 is a detail view of a modified form of translating device, partly in section.
Figure 15:
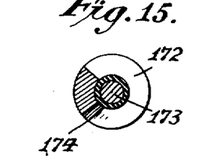
Fig. 15 is a sectional view on the line 15—15 of Fig. 14.

In Figs. 14 and 15, 172 indicates a helix of copper formed by cutting a spiral groove in a bar and by boring out the center of the bar. The result is a single layer of convolutions, as shown, of ribbon or tape-like formation, adjacent convolutions being separated by an air gap that may act as insulation between said convolutions. The diameter of the helix forming the coil may be from one-eighth to three-eighths inches. Disposed centrally of said helix is a core of iron 173 insulated from the helix by insulating sleeve 174. The helix is mounted in brackets 175 of conducting material, to which brackets cables 176 lead. The structure described forms a path of extremely low resistance to the current and at the same time creates a relatively powerful magnetic field even with a low voltage current. This device will act as a circuit closer in the systems described, say, in Figs. 6 and 7, the polarized armatures 137 being controlled by core 173. If, however, it is desired to utilize said helix as the low tension winding of an induction coil, a high tension winding can be wound around it, as will be understood.

Figure 12:
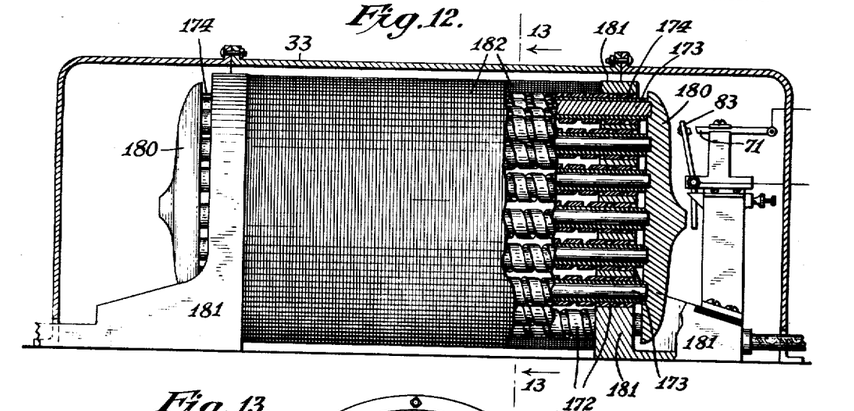
Fig. 12 is an enlarged detail view of one form of translating device, here the car-carried induction coil, partly in section and broken away.
Figure 13:
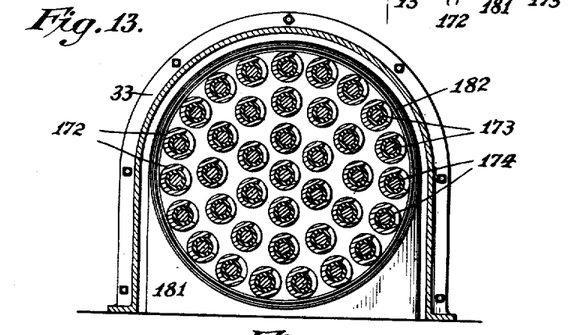
Fig. 13 is a sectional view on the line 13—13 of Fig. 12.
Figure 16:
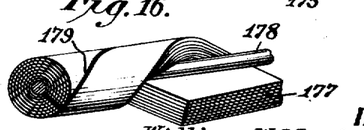
Fig. 16 is a perspective view of the method of winding still another form of translating device.

In Fig. 16, a strip 177 of laminated conducting material of large cross section is shown wound around a core 178 with insulation 179 between adjacent convolutions. This form may be used in place of the helix shown in Figs. 14 and 15. In Figs. 12 and 13 is shown a device utilizing a plurality of helices 172, shown in Fig. 14. These helices or coils have separate cores 173 and insulation sleeves 174, and are arranged in a group shown more particularly in Fig. 13. The cores 174 are connected to unitary pole pieces 180 at each end so as to concentrate the magnetic flux. Current is supplied to the helices by the standards 181 of conducting material, through which standards the end of the helices extend. In effect, therefore, the helices constitute parallel paths of very low resistance to permit a relatively large volume of current to flow; and, a very powerful magnetic field is produced dependent upon the number of ampere turns, even with a low voltage current. The device described constitutes a magnet and may be used as a circuit closer in the forms shown in Figs. 6 and 7. It may also constitute the low tension winding of an induction coil for use at the wayside or on the car. In that event, the high tension winding 182 is wound around the group of helices. When this is done, it may, of course, still act as a magnet controlling a circuit closer 83, such as shown in Fig. 1.

Figure 4:
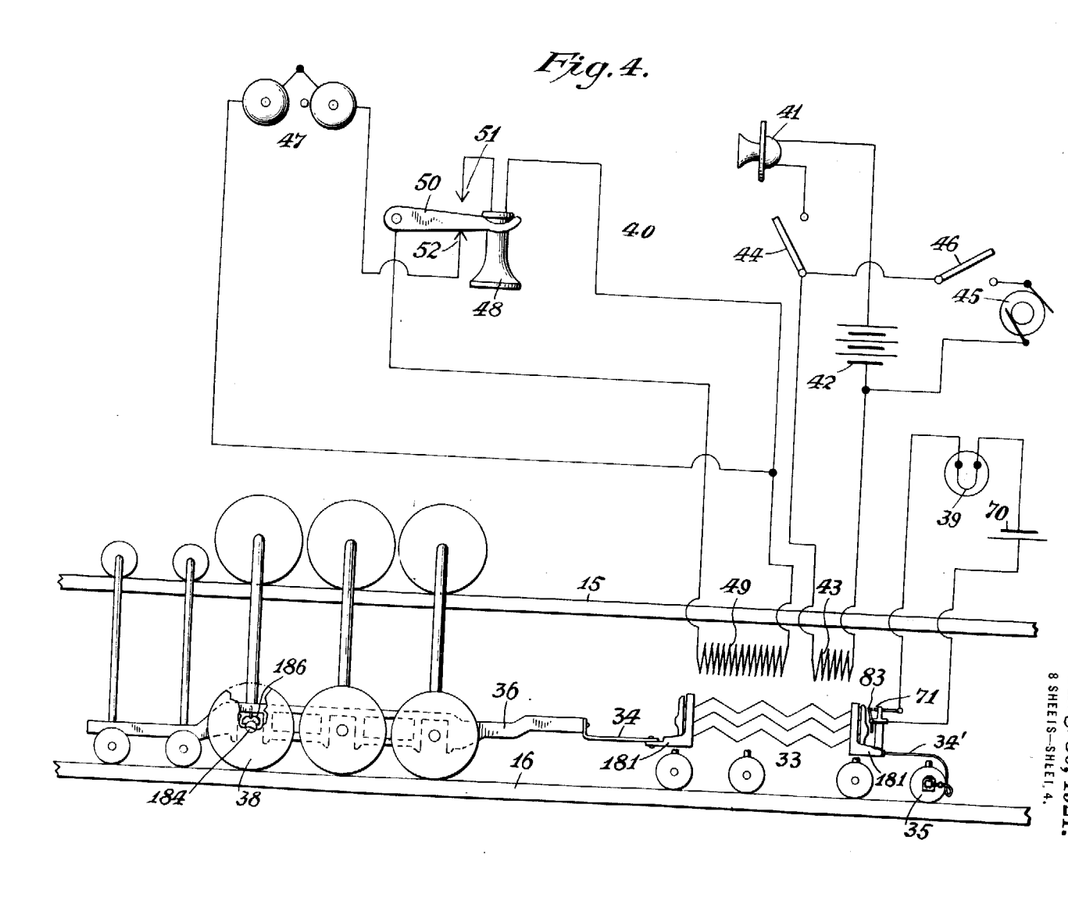
Fig. 4 is a detail diagrammatic view of the local car circuit contained in each of the cars indicated in Figs. 1, 2 and 3.
Figure 9:
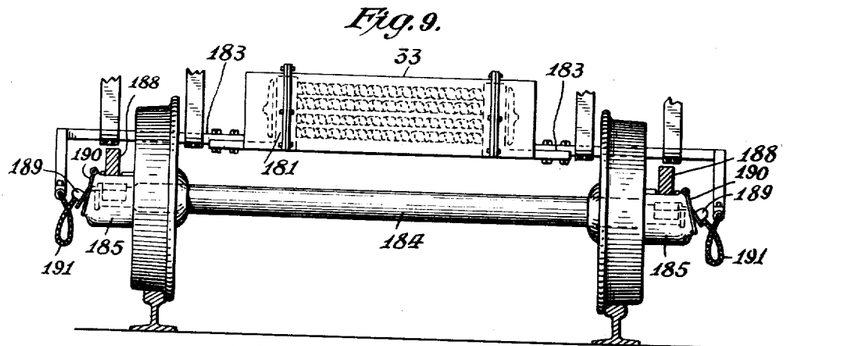
Fig. 9 is a detail view showing one method of mounting the translating device on a car.

The translating device may be applied to the car in various ways. In Fig. 4, one of the standards 181 of the member 33 is connected by means of a copper conductor 34 to the frame 36 of the locomotive; while the other standard 181 is connected by means of flexible conductor 34' to the truck 35 of the tender. In Fig. 9, the member 33 is mounted transversely of the car on the supports 183 of good conducting material. In either event, it is preferred, when making contact through the traffic wheels, to make the connection through journal bearing box so as to make use of the weight of the car to obtain good contact.

Figure 10:
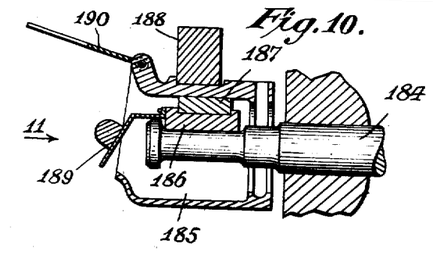
Fig. 10 is a sectional view on the line 10—10 of Fig. 11 through the journal box and bearing.
Figure 11:
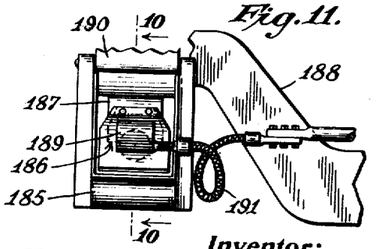
Fig. 11 is a view of the journal box, looking in the direction of the arrow 11, Fig. 10.

Referring to Figs. 10 and 11, it will be seen that 184 indicates the journal, of a car wheel, extending into the journal box 185. In contact with this journal 184 is the bearing block 186 between which and the journal box is interposed a wedge 187. 188 indicates a yoke member which rests on top of journal box 185 and sustains the load of the car so that an exceedingly good contact between the bearing block 186 and the journal 184 is obtained. Connected to the bearing block 186 is a conductor 189 extending through an opening in cover 190 of the journal box and having secured to it a cable conductor 191 extending lengthwise of the car. In Fig. 9, this copper cable conductor 191 is connected to the rigid conductor 183 secured to standards 181 of member 33. In Fig. 4, the flexible conductor 34' is an equivalent of the cable 191 of Figs. 10 and 11 and connects one of the standards 181 with the journal of wheel 35. Similarly, the locomotive frame 36, in Fig. 4, is connected to the bearing block 186 of the journal bearing of the driver 38 and thus establishes electrical communication between the locomotive frame and the track through the intermediacy of wheel 38 and journal 184.

I claim:

1. A system of communication including: a traffic track, a car, an induction coil on the car consisting of a high and a low tension winding, an induction coil along the line of way consisting of a high and a low tension winding, the low tension windings of the two induction coils and the track composing one circuit, a local circuit on the car including the high tension winding of the car-carried induction coil, a circuit along the line of way connected to the high tension winding of the wayside induction coil, a telephone set in the local car circuit, and a telephone set in the wayside circuit.

2. A system of communication including: a traffic track, a car, an induction coil on the car consisting of a high and a low tension winding, an induction coil along the line of way consisting of a high and a low tension winding, the low tension windings of the two induction coils and the track composing one circuit, a local circuit on the car including the high tension winding of the car-carried induction coil, a circuit along the line of way connected to the high tension winding of the wayside induction coil, a relay normally preventing a flow of current in the wayside circuit and responsive under certain traffic conditions to permit a flow of current in said circuit, a telephone set in the local car circuit, and a telephone set in the wayside circuit.

3. A system of communication including: a traffic track divided into sections, a car, an induction coil on the car consisting of a high and a low tension winding, an induction coil adjacent each block section along the line of way consisting of a high and a low tension winding, the low tension windings of the two induction coils and the track section occupied by the car composing one circuit, a local circuit on the car including the high tension winding of the car-carried induction coil, line wires along the line of way, a branch circuit from said line wires connected to the high tension winding of the wayside induction coil of each section, a telephone set connected to the line wires, and a telephone set connected to the local car circuit.

4. A system of communication including: a traffic track divided into sections, a car, an induction coil on the car consisting of a high and a low tension winding, an induction coil adjacent each block section along the line of way consisting of a high and a low tension winding, the low tension windings of the two induction coils and the track section occupied by the car composing one circuit, a local circuit on the car including the high tension winding of the car-carried induction coil, line wires along the line of way, a branch circuit from said line wires connected to the high tension winding of the wayside induction coil of each section, and a relay normally preventing a flow of current through the branch circuit and responsive to certain traffic conditions to permit a flow of current.

5. A system of communication between cars occupying different insulated sections including a traffic track divided into sections, a plurality of cars, an induction coil on each car consisting of a high and a low tension winding, an induction coil for each block section along the line of way consisting of a high and a low tension winding, the low tension windings of the wayside induction coil and of the induction coil of the car occupying the section constituting, with the track section occupied by the car, one circuit, a local circuit on each car including the high tension winding of the car-carried induction coil, line wires along the line of way, and branch conductors from said line wires connected to the high tension winding of the wayside induction coil of each section, a telephone set on each car responsive to the high tension winding of the induction coil carried by the car, and a telephone set connected to the line wires.

6. A system of communication including: two traffic rails, a car, an induction coil on the car consisting of a high and a low tension winding, an induction coil along the line of way consisting of a high and a low tension winding, said low tension winding of the wayside coil bridging the rails at one point, and a conductor bridging the rails at another point so that said low tension winding, the two rails and the conductor constitute a circuit with respect to which the car including the low tension winding of the car-carried induction coil, when occupying the track forms a parallel path, a local circuit on the car including the high tension winding of the car-carried induction coil, a circuit connected to the high tension winding of the wayside induction coil, a telephone set connected to the high tension winding of the car-carried coil, and a telephone set in the circuit connected to the high tension winding of the wayside coil.

7. A system of communication including: two traffic rails, a car, an induction coil on the car consisting of a high and a low tension winding, an induction coil along the line of way consisting of a high and a low tension winding, said low tension winding of the wayside coil bridging the rails at one point, and a conductor bridging the rails at another point so that said low tension winding, the two rails and the conductor constitute a circuit, with respect to which the car, including the low tension winding of the car-carried induction coil, when occupying the track, forms a parallel path, a local circuit on the car including the high tension winding of the car-carried induction coil, a circuit connected to the high tension winding of the wayside induction coil, and a relay normally preventing a flow of current to the high tension winding of the wayside coil and responsive to certain traffic conditions to permit a flow of current.

8. A sytem of communication including: two traffic rails, a car, an induction coil on the car consisting of a high and a low tension winding, an induction coil along the line of way consisting of a high and a low tension winding, said low tension winding of the wayside coil bridging the rails at one point, and a conductor bridging the rails at another point so that said low tension winding, the two rails and the conductor constitute a circuit with respect to which the car, including the low tension winding of the car-carried induction coil when occupying the track, forms a parallel path, a local circuit on the car including the high tension winding of the car-carried induction coil, line wires along the line of way, branch conductors connecting the line wires and the high tension winding of the wayside induction coil, a telephone set connected to the line wires, and a telephone set connected to the local car circuit.

9. A system of communication including: two traffic rails, a car, an induction coil on the car consisting of a high and a low tension winding, an induction coil along the line of way consisting of a high and a low tension winding, said low tension winding of the wayside coil bridging the rails at one point, and a conductor bridging the rails at another point so that said low tension winding, the two rails and the conductor constitute a circuit, with respect to which the car, including the low tension winding of the car-carried induction coil, when occupying the track, forms a parallel path, a local circuit on the car inluding the high tension winding of the car-carried induction coil, line wires along the line of way, branch conductors connecting the line wires and the high tension winding of the wayside induction coil, a relay normally preventing a flow of current in the branch conductors and responsive to certain traffic conditions to permit a flow of current, a telephone set connected to the line wires, and a telephone set connected to the local car circuit.

10. A system of communication including: a double traffic track, a car, an induction coil on the car consisting of a high and a low tension winding, an induction coil along the line of way consisting of a high and a low tension winding, said low tension winding of the wayside coil bridging adjacent rails of the double track at one point, and a conductor bridging said rails at another point so that said low tension winding, the two adjacent rails of the double track and the conductor constitute a circuit with respect to which the car including the low tension coil, when occupying the track, forms a parallel path, a local circuit on the car including the high tension winding of the car-carried induction coil, and a circuit connected to the high tension winding of the wayside induction coil.

11. A system of communication including: a double traffic track, a car, and an induction coil on the car consisting of a high and a low tension winding, an induction coil along the line of way consisting of a high and a low tension winding, said low tension winding of the wayside coil bridging adjacent rails of the double track at one point, and a conductor bridging said rails at another point so that said low tension winding, the two adjacent rails of the double track and the conductor constitute a circuit with respect to which the car including the low tension coil, when occupying the track, forms a parallel path, a local circuit on the car including the high tension winding of the car-carried induction coil, line wires along the line of way, and branch conductors connecting the line wires and the high tension winding of the wayside induction coil.

12. A system of communication including: a double traffic track, a car, and an induction coil on the car consisting of a high and a low tension winding, an induction coil along the line of way consisting of a high and a low tension winding, said low tension winding of the wayside coil bridging adjacent rails of the double track at one point, and a conductor bridging said rails at another point so that said low tension winding, the two adjacent rails of the double track and the conductor constitute a circuit with respect to which the car including the low tension coil, when occupying the track, forms a parallel path, a local circuit on the car including the high tension winding of the car-carried induction coil, a circuit connected to the high tension winding of the wayside induction coil, a telephone set connected to the high tension winding of the car-carried coil, and a telephone set in the circuit connected to the high tension winding of the wayside coil.

13. A system of communication including: a double traffic track, a car, an induction coil on the car consisting of a high and a low tension winding, an induction coil along the line of way consisting of a high and a low tension winding, said low tension winding of the wayside coil bridging adjacent rails of the double track at one point, and a conductor bridging said rails at another point so that said low tension winding, the two adjacent rails of the double track and the conductor constitute a circuit with respect to which the car, including the low tension coil, when occupying the track, forms a parallel path, a local circuit on the car including the high tension winding of the car-carried induction coil, a circuit connected to the high tension winding of the wayside induction coil and a relay normally preventing a flow of current to the high tension winding of the wayside coil and responsive to certain traffic conditions to permit a flow of current.

14. A system of communication including: a double traffic track, a car, an induction coil on the car consisting of a high and a low tension winding, an induction coil along the line of way consisting of a high and a low tension winding, said low tension winding of the wayside coil bridging adjacent rails of the double track at one point, and a conductor bridging said rails at another point, so that said low tension winding, the two adjacent rails of the double track and the conductor constitute a circuit, with respect to which, the car, including the low tension coil, when occupying the track, forms a parallel path, a local circuit on the car including the high tension winding of the car-carried induction coil, line wires along the line of way, branch conductors connecting the line wires and the high tension winding of the wayside induction coil, a telephone set connected to the line wires, and a telephone set connected to the local car circuit.

15. A system of communication including: a double traffic track, a car, an induction coil on the car consisting of a high and a low tension winding, an induction coil along the line of way consisting of a high and a low tension winding, said low tension winding of the wayside coil bridging adjacent rails of the double track at one point, and a conductor bridging said rails at another point so that said low tension winding, the two adjacent rails of the double track and the conductor constitute a circuit with respect to which the car, including the low tension coil, when occupying the track, forms a parallel path, a local circuit on the car including the high tension winding of the car-carried induction coil, line wires along the line of way, branch conductors connecting the line wires and the high tension winding of the wayside induction coil, a relay normally preventing a flow of current in the branch conductors and responsive to certain traffic conditions to permit a flow of current, a telephone set connected to the line wires, and a telephone set connected to the local car circuit.

16. A system of communication including: a traffic track divided into sections, a plurality of cars, a central station and means for establishing communication between the central station and the cars through the rails of the track or for establishing communication between the cars through the rails of the track.

17. A system of communication comprising: a traffic track divided into sections, a train comprising a plurality of cars occupying different sections, means for establishing communication from the cars to the rails of the sections occupied by the respective cars, and means for establishing communication between the rail sections occupied by the different cars.

18. A system of communication comprising: a double track railway, a wayside communicating station, a circuit including one rail of each track and adapted to be controlled by said wayside communicating station, a train, and train-carried means responsive to the condition of the circuit including the track rails engaged by the train.

19. A system of communication comprising: a double track railway, a wayside communicating station, a circuit including one rail of each track and adapted to be controlled by and to control said wayside communicating station, a train, a communicating station of said train adapted to be controlled by and to control the circuit including the track rail engaged by the train.

20. A system of communication comprising: a double track railway, a circuit including one rail of each track, a train, and train-carried means responsive to the condition of the circuit including the track rail engaged by the train, said train-carried means forming a parallel path communicating with said rail at separated points along the length thereof.

21. A system of communication comprising: a double track railway, a circuit including one rail of each track, a telephone set arranged to have communication with said circuit, and a train-carried telephone set having communication with said circuit through the track rail in each section engaged by the train.

22. A system of communication comprising: a double track railway divided into sections, a circuit for each section including one rail of each track, a wayside telephone station arranged to control the circuit in each section, means for selectively signaling from the wayside station to a train in any desired section, a train, and a train carried telephone set arranged to coöperate with the circuit including the track rail in each section engaged by the train.

23. A system of communication comprising: a double track railway divided into sections, a circuit for each section including one rail of each track, means for establishing communication between the circuits of different train-occupied sections and train carried telephone sets each having communication with one of said circuits through a track rail, whereby telephonic communication can be had between trains in different sections.

24. A system of communication comprising: a double track railway divided into sections, a circuit for each section including one rail of each track, means for causing the circuit of one train-occupied block to control the circuit of another train-occupied block and communicating apparatus carried adjacent each end of each train, said apparatus arranged to control and to be controlled by the circuit including the track rail engaged by the train, whereby communication can be had between the ends of the train when the ends of the train are in different sections.

25. A system of communication including: a traffic track, a car, a circuit connected to the track at two points on the same rail, an electroresponsive device in said circuit, and a translating device on the car having connections through the wheels of the car at two points with the same rail of the track for impressing upon the rail a current of such value that it will pass not only along the rail between the two points of contact of the translating device with said rail but a quantity of current sufficient to actuate the electroresponsive device will also pass through said circuit.

26. A system of communication including: a traffic track, a car, a circuit connected to the track at two points on the same rail, an electroresponsive device in said circuit, a translating device on the car having connections through the wheels of the car at two points with the same rail of the track for impressing upon the rail a current of such value that it will pass not only along the rail between the two points of contact of the translating device with said rail but a quantity of current sufficient to actuate the electroresponsive device will also pass through said circuit, and a telephone set extraneous of the circuit, car and track responsive to said electroresponsive device.

27. A system of communication including: a traffic track, a car, a circuit connected at two points with the track, an electroresponsive device in said circuit, and a translating device on the car having connection through a plurality of uninsulated wheels and axles of the car with the track for impressing upon the track a current of such value that it will take not only the shortest path open to it but a quantity thereof sufficient to actuate the electroresponsive device will also pass through said circuit.

28. A system of communication including: a traffic track, a car, a circuit connected at two points to the track, an electroresponsive device in said circuit, a translating device on the car having connection through a plurality of uninsulated wheels and axles of the car with the track for impressing upon the track a current of such value that it will take not only the shortest path open to it but a quantity thereof sufficient to actuate the electroresponsive device will also pass through said circuit, and a telephone set extraneous of the circuit, car and track responsive to said electroresponsive device.

29. A system of train telephony comprising: track rails, a car, a wayside telephone apparatus having electrical communication with one of said rails at two separated points, and a telephone apparatus on the car having electrical communication with said rail at two separated points between the points of communication of the wayside telephone apparatus with said rail.

30. A system of train telephony comprising: track rails, a car, a wayside telephone apparatus, means for electrically connecting said wayside telephone apparatus with one of said rails at two separated points, a source of current in said connecting means, and a telephone apparatus on the car having electrical communication with said rail at two separated points between the points of communication of the wayside telephone apparatus with said rail.

31. A system of train telephony comprising: track rails divided into blocks, a wayside telephone apparatus having electrical communication with one of the rails in each block at both ends of the block, and train carried telephone apparatus arranged to have electrical communication at two separated points with said rail.

Signed at Moncton, in the Province of New Brunswick, Dominion of Canada this nineteenth day of November, 1917.

WILLIAM W. MACFARLANE.